July 18, 1950     H. G. HUGHEY     2,515,302
APPARATUS FOR CONTROLLING RELATIVE MOVEMENT
BETWEEN A GAS TORCH AND A WORKPIECE
Filed Aug. 27, 1947
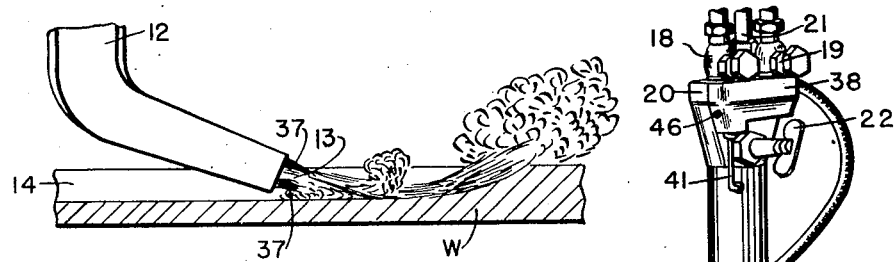
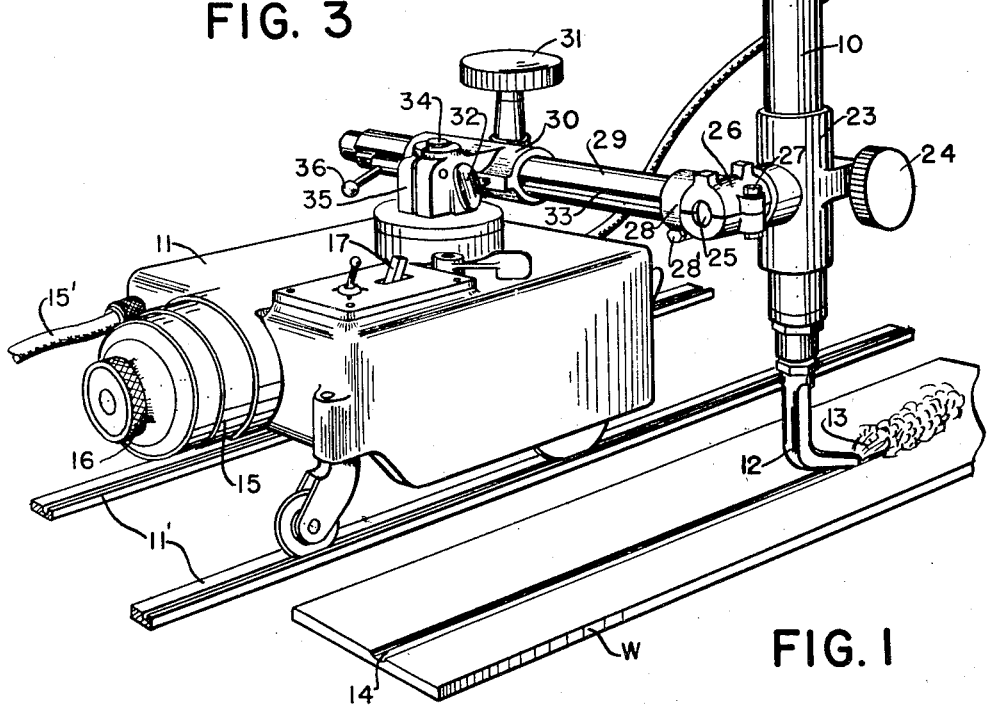
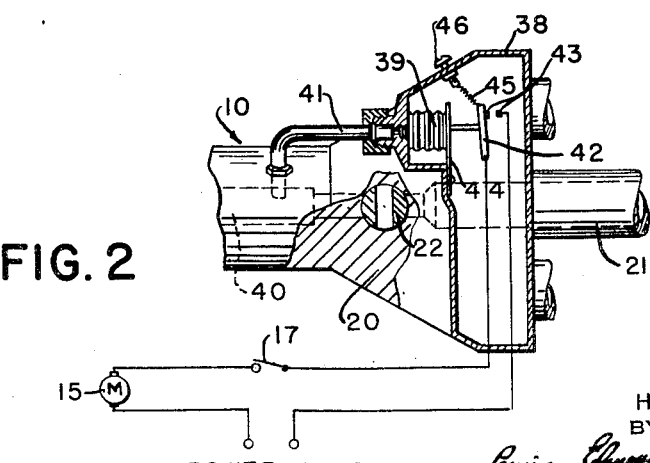
INVENTOR
HOWARD G. HUGHEY
BY
ATTORNEYS Patented July 18, 1950

2,515,302

UNITED STATES PATENT OFFICE 2,515,302

APPARATUS FOR CONTROLLING RELATIVE MOVEMENT BETWEEN A GAS TORCH AND A WORKPIECE

Howard G. Hughey, Fanwood, N. J., assignor to Air Reduction Company, Incorporated, a corporation of New York Application August 27, 1947, Serial No. 770,860

7 Claims. (Cl. 266—23)

This invention relates to apparatus for producing relative movement between a gas torch and a metal work-piece to cause the torch to progressively cut or groove the work-piece or perform some other thermochemical operation on it.

In many thermochemical operations on metal it is desirable to stop the relative movement between the torch and the work-piece should the pressure of the cutting-oxygen delivered to the torch fall to or below a value at which the cutting-oxygen can no longer function as intended, i. e., should the pressure fall to or below a value at which the thermochemical action on the metal ceases or takes place at too slow a rate in relation to the rate of relative movement between the torch and the work-piece. This is of special importance in operations where the apparatus or the work-piece itself may be damaged if the relative movement were continued. Such an operation, for example, is the grooving of a metal work-piece by a gas torch having a forwardly directed tip which lies at least partly in the groove gouged in the work-piece by the torch. Continued relative movement between the torch and the work-piece, should the pressure of the cutting-oxygen fall to or below a value at which the thermochemical action proceeds at too slow a rate or stops altogether, would cause the tip of the torch to come in contact with the end of the groove with the possibility of damaging either the apparatus or the work-piece.

It has already been proposed to propel a cutting torch carriage by a gas motor operated by the cutting-oxygen on its way to the torch so that any reduction in pressure of the cutting-oxygen will reduce the speed of travel of the carriage proportionately. However, it is evident that in such an apparatus the gas motor will continue to propel the torch carriage so long as there is any flow of cutting-oxygen at all, and the carriage will not stop merely because of a drop in pressure of the cutting-oxygen to some predetermined level that is still considerably above zero pressure but below the pressure at which the thermochemical action on the metal no longer proceeds satisfactorily.

The principal object of this invention is to control the relative movement between the torch and the work-piece by the pressure of the cutting-oxygen delivered to the torch so that there can be relative movement only when the cutting-oxygen pressure is sufficiently high and so that the relative movement will stop in case the pressure of the cutting-oxygen drops to or below a value at which the thermochemical action on the metal fails to proceed as intended.

According to the invention in its preferred form, the gas torch is mounted on an electrically driven torch carriage which advances the torch along the work-piece, and a pressure-responsive switch associated with the torch operated by the cutting-oxygen delivered to the torch renders the carriage motor effective to propel the carriage when the pressure of the cutting-oxygen is sufficiently high for the thermochemical action to proceed satisfactorily but renders the motor ineffective to propel the carriage when the pressure of the cutting-oxygen drops to or below some predetermined value above zero at which the thermochemical action no longer proceeds satisfactorily.

The invention as applied to an electrically driven torch carriage and a torch adapted to perform a grooving operation on a work-piece is illustrated in the accompanying drawing, in which:

Figure 1 is a perspective view of the torch and carriage;

Fig. 2 is a fragmentary view of the torch head shown partly in section to expose the pressure-responsive switch which is illustrated more or less schematically and is shown in a diagrammatic manner electrically connected in the circuit of the carriage motor; and Fig. 3 is an enlarged sectional view along the line of the groove showing the relationship between the torch tip and the groove which it cuts in the work-piece.

Referring first to Fig. 1, a gas torch such as that shown at 10, mounted on a self-propelled carriage 11, has a cutting or gouging tip 12 from which a jet of cutting-oxygen 13 is directed against a work-piece W. The carriage 11 runs on a track 11' which is arranged in relation to the work-piece to guide the carriage and the torch in the desired direction so that the torch will gouge or cut a groove 14 in the work-piece. The carriage is propelled by an electric motor 15 that receives current from a suitable source by means of an electric conductor 15'. The speed of the motor is controlled by an adjustable speed control governor whose adjusting knob is shown at 16. Current is delivered to the drive motor of the carriage when a switch 17 is in its "On" position.

The torch 10 may be a standard machine cutting torch having valves 18 and 19 which control the supply of preheating oxygen and fuel gas to the torch head 20 from which conduits deliver them through the torch to the tip 12. Cutting-oxygen is delivered to the torch by means of a hose or pipe 21, the supply of cutting-oxygen to the torch tip being controlled by means of a valve 22 in the torch head.

The torch 10 is mounted in a sleeve 23 in which it may be adjusted vertically by turning a knob 24 in a manner well understood in the art. A horizontal stud 25 extending from the sleeve 23 is received in a split clamp 26, the two halves of which may be drawn together and clamped against the stud when a bolt 27 is tightened. A portion of the clamp 26 forms a second split clamp 28 whose axis is at right angles to the axis of the split clamp 26 and which serves to attach the clamp 26 to the end of a transverse torch arm 29 when a bolt 28' on the split clamp 28 is tightened. By this arrangement the torch may be raised or lowered to bring the tip to any desired level by turning the knob 24, and the angularity of the torch with respect to the work-piece may be adjusted by loosening the clamps 26 and 28 and swinging the torch about the axis of the stud 25 and the axis of the torch arm 29.

A sleeve 30 carried by the torch carriage receives the torch arm 29. By turning a knob 31 the torch arm 29 can be moved longitudinally in the sleeve 30, as is well understood, to adjust the torch toward or away from the torch carriage. A thumb screw 32, mounted in the sleeve 30, has an end portion which projects into a longitudinal groove 33 in the torch arm 29 and prevents turning of the torch arm in the sleeve 30. The sleeve 30 is clamped to a vertical post 34 on the torch carriage 11 by a split clamp 35 which is integral with the sleeve and which may be tightened by turning a handle 36.

Referring now to Fig. 3 it will be seen that the torch tip 12 is arranged to deliver the cutting oxygen jet 13 angularly against the surface of the work-piece W to gouge or cut the groove 14. The preheating gases issue from the torch tip and feed preheating flames 37 to heat the metal to ignition temperature in a manner well understood in the art. A portion of the torch tip extends into the groove below the surface of the work-piece as clearly shown in Fig. 3. This is done to place the cutting-oxygen jet 13 in close proximity to the metal being removed and to produce a deeper groove. It will be seen that when the torch tip is in this relation to the work-piece, the cutting-oxygen jet must cause the thermochemical action to continue as intended; otherwise, continued forward movement of the torch carriage would bring the torch tip into engagement with the end of the groove, with possible damage either to the apparatus or the work-piece. If the pressure of the cutting-oxygen falls to or below some predetermined value at which the thermochemical action does not proceed properly, or stops altogether, it is desirable to stop the movement of the torch carriage to prevent the collision between the torch tip and the end of the groove. To stop the torch carriage if the pressure of the cutting-oxygen falls to or below this value a pressure-responsive switch is associated with the torch and electrically connected to the drive motor of the carriage in the manner shown in Fig. 2.

Referring to Fig. 2, a switch casing 38 is mounted on the torch head 20. Within the casing there is positioned a bellows or other pressure-responsive device 39 which is in communication at one end with the cutting-oxygen passage 40 in the torch by means of a connecting tube 41. The other end of the bellows is closed. The bellows is operatively connected to a switch arm 42, the movement of which controls the opening and closing of a pair of switch contacts 43. The contacts 43 are connected in series with the drive motor 15 as shown by the circuit diagram in Fig. 2. When the contacts 43 are closed a circuit is completed to the motor provided the control switch 17 on the torch carriage is closed. When the contacts 43 are open the motor circuit is broken and the supply of current to the motor is cut off and the torch carriage will stop. The switch contacts therefore constitute a circuit breaker for the motor.

A leaf spring 44 secured to a side of the switch casing 38 bears against the free end of the bellows 39 and biases the bellows to collapsed position. A coil spring 45 is secured at one end to the switch arm 42 and is swivelly attached at its other end to an adjusting screw 46. By turning the adjusting screw 46 the tension of the spring 45 may be varied. The springs 44 and 45 jointly exert a force which opposes expansion of the bellows and which tends to open the switch contacts 43.

It will now be seen that when the cutting-oxygen valve 22 is open some of the cutting-oxygen passes from the passage 40 into the interior of the bellows 39 through the connecting tube 41. However, the springs 44 and 45 allow the switch contacts 43 to close only when the pressure of the cutting-oxygen in the passage 40 has reached some predetermined minimum value. The pressure at which the switch contacts will close can be varied within a limited range by adjusting the screw 46.

For most thermochemical operations on metal the pressure of the cutting-oxygen must be fairly high at the discharge orifice in the torch tip in order to provide the necessary velocity and density of the oxygen. For instance, for grooving operations of the kind illustrated, and various other thermochemical operations, the pressure of the cutting-oxygen preferably should be maintained above approximately 27 pounds per square inch absolute to cause the thermochemical action on the metal to proceed satisfactorily. Assuming this to be the pressure of the cutting-oxygen required to cause the cutting-oxygen jet 13 to continue cutting the groove in a satisfactory manner, the springs 44 and 45 are designed and adjusted so that the bellows 39 will not be expanded sufficiently to close the switch contacts 43 until this pressure of the cutting-oxygen is attained. Thus, until the cutting-oxygen attains this pressure the torch carriage will not start because the circuit of the drive motor 15 on the carriage is open. After the contacts have closed and during the grooving operation, should the pressure of the cutting-oxygen fall to or below this pressure so that the thermo-chemical action on the metal ceases or no longer proceeds in the intended way, or in a satisfactory manner, the switch contacts will open to break the circuit of the motor and stop movement of the carriage in time to prevent the tip of the torch from striking the end of the groove in the work-piece. By adjusting the screw 46 the switch contacts may be made to open and close at any desired predetermined pressure of the cutting-oxygen within certain limits.

Of course, the torch carriage will be stopped if the cutting-oxygen valve 22 is closed to shut off the supply of cutting-oxygen to the passage 40 or if the supply of cutting-oxygen fails for any reason, but it is not only important that the torch carriage stops moving in these cases but also in the event that the pressure of cutting-oxygen falls to or below some predetermined value above zero at which the thermochemical action will cease or no longer proceed as it should.

Instead of connecting the switch contacts 43 in series with the drive motor 15 to make and break the main motor circuit, they could be used to render the motor ineffective to propel the carriage in some other way, as by utilizing them to operate a clutch or other device which makes and breaks the driving connection between the motor and the carriage.

While the invention has been specifically described in connection with a grooving operation, it will be understood that it is not limited thereto but may be used in connection with other thermochemical operations.

I claim:

1. Apparatus for thermochemically removing metal from a ferrous metal work-piece comprising a gas torch, means including an electric motor for producing relative movement between the torch and the work-piece, means for supplying cutting-oxygen to the gas torch, electrical connections for supplying current to said motor, and fluid operated means associated with the torch responsive to the pressure of the cutting-oxygen and including a circuit breaker in said electrical connections to render said motor inoperative when the oxygen pressure falls to or below a predetermined value.

2. Apparatus for thermochemically removing metal from a ferrous metal work-piece comprising a gas torch having a cutting-oxygen passage, means including an electric motor for producing relative movement between the torch and the work-piece, means for supplying cutting-oxygen to the gas torch, electrical connections for supplying current to said motor, a pressure-responsive device associated with the torch and connected with said cutting-oxygen passage, and a circuit breaker in said electrical connections adapted to be actuated by said pressure-responsive device to render said motor inoperative when the oxygen pressure falls to or below a predetermined value.

3. Apparatus for performing a thermochemical operation on a ferrous metal work-piece comprising a gas torch, driving means for producing relative movement between the torch and the work-piece, means for rendering said driving means effective and ineffective to produce said relative movement, means for supplying cutting-oxygen to the gas torch, and a fluid-operated device responsive to the pressure of the cutting-oxygen delivered to the torch and operatively connected to the means that renders the driving means effective and ineffective.

4. Apparatus for performing a thermochemical operation on a ferrous metal work-piece comprising a gas torch having a cutting-oxygen passage, driving means for producing relative movement between the torch and the work-piece, means for rendering said driving means effective and ineffective to produce said relative movement, means for supplying cutting-oxygen to the gas torch, and a fluid-operated device in communication with said passage in the torch and responsive to the pressure of the cutting-oxygen therein and operatively connected to the means that renders the driving means effective and ineffective.

5. Apparatus for thermochemically removing metal from a ferrous metal work-piece comprising a torch carriage, a motor for propelling the same, means for rendering said motor effective and ineffective to propel the carriage, a gas torch carried by the carriage, means for supplying cutting-oxygen to the torch, and a fluid-operated device responsive to the pressure of the cutting-oxygen delivered to the torch and operatively connected to the means that renders the motor effective and ineffective to propel the carriage.

6. Apparatus for thermochemically removing metal from a ferrous metal work-piece comprising a torch carriage, an electric motor for propelling the same, an electric switch for rendering said motor effective and ineffective to propel the carriage, a gas torch carried by the carriage, means for supplying cutting-oxygen to the torch, and a fluid-operated device responsive to the pressure of the cutting-oxygen delivered to the torch and operatively connected to said electric switch.

7. Apparatus for thermochemically grooving a ferrous metal work-piece comprising a torch carriage, a motor for propelling the carriage, means for rendering said motor effective and ineffective to propel the carriage, a gas grooving torch carried by the carriage and having a forwardly directed tip adapted to lie at least partly in the groove gouged in the work-piece by the torch, and a fluid-operated device responsive to the pressure of the cutting-oxygen delivered to the torch and operatively connected to the means that renders the motor effective and ineffective to propel the carriage.

HOWARD G. HUGHEY.

REFERENCES CITED

The following references are of record in the file of this patent:

UNITED STATES PATENTS

| Number | Name | Date |
|---|---|---|
| 1,359,530 | Richardson | Nov. 23, 1920 |
| 1,839,495 | Paynter | Jan. 5, 1932 |
| 1,940,319 | Nolte | Dec. 19, 1933 |
| 2,177,276 | Bucknam | Oct. 24, 1939 |
| 2,185,490 | Wittman | Jan. 2, 1940 |
| 2,258,835 | Williams | Oct. 14, 1941 |
| 2,261,845 | Denneen et al. | Nov. 4, 1941 |
| 2,329,904 | Howard | Sept. 21, 1943 |